US007434167B2

(12) United States Patent
Sinclair et al.

(10) Patent No.: US 7,434,167 B2
(45) Date of Patent: Oct. 7, 2008

(54) ACCESSIBILITY SYSTEM AND METHOD

(75) Inventors: Robert Sinclair, Sammamish, WA (US); Patricia M. Wagoner, Redmond, WA (US); Brendan McKeon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 748 days.

(21) Appl. No.: 10/367,226

(22) Filed: Feb. 14, 2003

(65) Prior Publication Data

US 2004/0064593 A1    Apr. 1, 2004

Related U.S. Application Data

(60) Provisional application No. 60/415,339, filed on Sep. 30, 2002.

(51) Int. Cl.
*G06F 3/00* (2006.01)
*G06F 17/30* (2006.01)
*G09G 5/00* (2006.01)

(52) U.S. Cl. .......................... 715/744; 707/3; 345/156
(58) Field of Classification Search ................ 715/744
See application file for complete search history.

(56) References Cited

U.S. PATENT DOCUMENTS

| | | | |
|---|---|---|---|
| 5,327,529 A * | 7/1994 | Fults et al. | 715/762 |
| 5,613,122 A | 3/1997 | Burnard et al. | |
| 5,923,328 A | 7/1999 | Griesmer | |
| 6,144,377 A * | 11/2000 | Oppermann et al. | 715/744 |
| 6,161,126 A | 12/2000 | Wies et al. | |
| 6,341,280 B1 | 1/2002 | Glass et al. | |
| 6,532,023 B1 * | 3/2003 | Schumacher et al. | 715/704 |

FOREIGN PATENT DOCUMENTS

| | | |
|---|---|---|
| WO | 9716796 A1 | 5/1997 |
| WO | WO 97/44720 | 11/1997 |
| WO | 0243353 A2 | 5/2002 |

OTHER PUBLICATIONS

Vogtle et al. "A critical interface: occupational therapy, engineering and assistive technology" Jul. 2000, Conference of IEEE, pp. 2379-2382.*

* cited by examiner

*Primary Examiner*—William L. Bashore
*Assistant Examiner*—Jordany Núñez
(74) *Attorney, Agent, or Firm*—Shook, Hardy & Bacon, L.L.P.

(57) ABSTRACT

A method and system providing a client with user interface information are described. An accessibility system for providing user interface information to a client. The accessibility system comprises an accessibility system core including user interface automation services and APIs. The user interface automation tools filter information based on whether the user interface information is interesting to the client. The accessibility system additionally comprises a client side interface including a logical tree for revealing user interface information that is interesting to the client and for hiding user interface information that is not interesting to the client. The accessibility system also comprises a server side interface for facilitating information transfer from a server side regardless of the server side technology.

15 Claims, 7 Drawing Sheets

ACCESSIBILITY SYSTEM AND METHOD

CROSS REFERENCE TO RELATED APPLICATIONS

This invention claims the benefit of U.S. Provisional Application Ser. No. 60/415,339, filed Sep. 30, 2002.

STATEMENT REGARDING FEDERALLY SPONSORED RESEARCH OR DEVELOPMENT

Not Applicable.

TECHNICAL FIELD

The invention relates to the field of assistive technology and automated testing products and the interaction of these products with user interface information.

BACKGROUND OF THE INVENTION

Assistive technology (AT) products exist to help computer users who have a need for assistance in areas of learning, communication and access to information contained in and presented by computer software. These products have a need for information relevant to the computer interface. Similarly, existing automated testing products and user interface commanding utilities also have a need for information about the user interface. Currently, these products have no sufficient source of user interface (UI) information. These three types of products (clients) are required to have necessary support from elsewhere to enable them to: (1) gather information about an application's user interface; (2) programmatically discover and interrogate UI elements regardless of the technology used to build the UI; (3) generate keyboard and pointer input; and (4) understand what type of behavior or functionality is currently available. No single technology is available currently that gives an AT product all of these capabilities. Furthermore, current AT products are not always compatible with all graphical operating system (OS) technologies and lack the ability to filter and coordinate redundant or misleading notifications in a centralized way. An additional disadvantage is that current automation and accessibility infrastructures are not extensible and therefore require OS level changes to add new functionality.

Furthermore, currently to gather information about an application's user interface, the AT product must write application-specific code to obtain information for the user. The process of writing this application-specific code is time consuming and requires continuous maintenance. Current automation infrastructure also lacks the ability to filter and coordinate redundant or misleading event notifications in a consistent manner. Thus, event consumers are required to independently filter information.

Current systems allow AT products to request event notifications in three levels of granularity: (1) everything on a desktop; (2) in a particular process (such as opening of a word processor); or (3) in a thread in the particular process (multiple objects doing work in the process). Currently, when the client receives an event, it receives a window handle for a specific window in which the event occurred and other bits of information to indicate where the event occurred. A client can make a cross process call to retrieve the UI object that is related to the event. With this object, the client can make additional cross process calls to ask for information about that object. If the client needs five pieces of information, then the client must make five cross process calls. Cross process calls are exceedingly slow, so the performance cost of collecting UI information using current accessibility infrastructure is high. This type of known scenario is shown in FIG. 8. A server application 12 fires an event 6. A kernel 14 determines which clients must be notified and sends an event notification 18 to an interested client 10. The client 10 makes a request 16 from the server application 12 across a process boundary 2 for the object related to the event notification 18. The server application 12 returns the object 20 and then the client 10 can begin sending requests 16 for information about the UI control which fired the event. The server application 12 returns the requested information 20 across the process boundary 2 to the client 10.

Another current option allows client code to be loaded as a dynamic link library (.DLL) within a process. This option has several drawbacks. First, it requires cooperation from the system to load client code into a process. Second, it gives rise to security issues because once in the client code is loaded into an application's process, it is difficult to restrict the information it gathers. Third, to be an effective technique for the client, it must be loaded into every process on the system. Optimally, only trusted clients should be loaded into another application's process.

Furthermore, a system is needed that gives the client the ability to specify what event notifications it wants to receive. In known systems, a client may need to make a number of cross process calls and then analyze the information to determine if it is interested in the event. A mechanism is needed that can perform this event filtering in a more performant manner and that can be easily updated to support new system or application events. Furthermore, a system is needed that uses only trusted components in order to alleviate security concerns.

Currently, when seeking information about a user interface, the AT product is required to access trees that are native to a particular UI framework. Accordingly, multiple trees are required to convey user interface information for multiple UI frameworks. These differing trees may contain information which is not of interest or is not visible to the user, such as hidden container objects which manage the visible UI controls manipulated by the end user. Therefore, a need exists for a single unified tree having only those nodes that are of interest to the user.

A solution is needed that addresses the needs of AT products, automated testing tools, and commanding utilities. The solution should be usable by all graphical OS technologies and should allow all forms of UI and UI components to become accessible.

BRIEF SUMMARY OF THE INVENTION

The present invention is directed to a method and computer application for providing a client with user interface information. In one aspect of the invention, an accessibility system for providing user interface information to a client is provided. The accessibility system includes an accessibility system core including user interface automation services for filtering information based on whether the user interface information is interesting to the client. The accessibility system additionally includes a client side interface including a logical tree for revealing user interface information that is interesting to the client and for hiding user interface information that is not interesting to the client. The accessibility system also includes a server side interface for facilitating information transfer from a server side application regardless of the user interface engine used to build that application.

In yet another aspect of the invention, a computer-implemented method for providing user interface information to a client is provided. The method includes monitoring user interface information with accessibility system automation services and transferring user interface information over a server side interface regardless of server side technology. The method further includes determining specific user interface information that is interesting to the client using a logical element tree that forms a part of the client-side interface.

Additional advantages and novel features of the invention will be set forth in the description which follows, and in part will become apparent to those skilled in the art upon examination of the following, or may be learned from practice of the invention.

BRIEF DESCRIPTION OF THE DRAWINGS

The present invention is described in detail below with reference to the attached drawing figures, wherein.

DETAILED DESCRIPTION OF THE INVENTION

Exemplary Operating Environment

Figure 1:
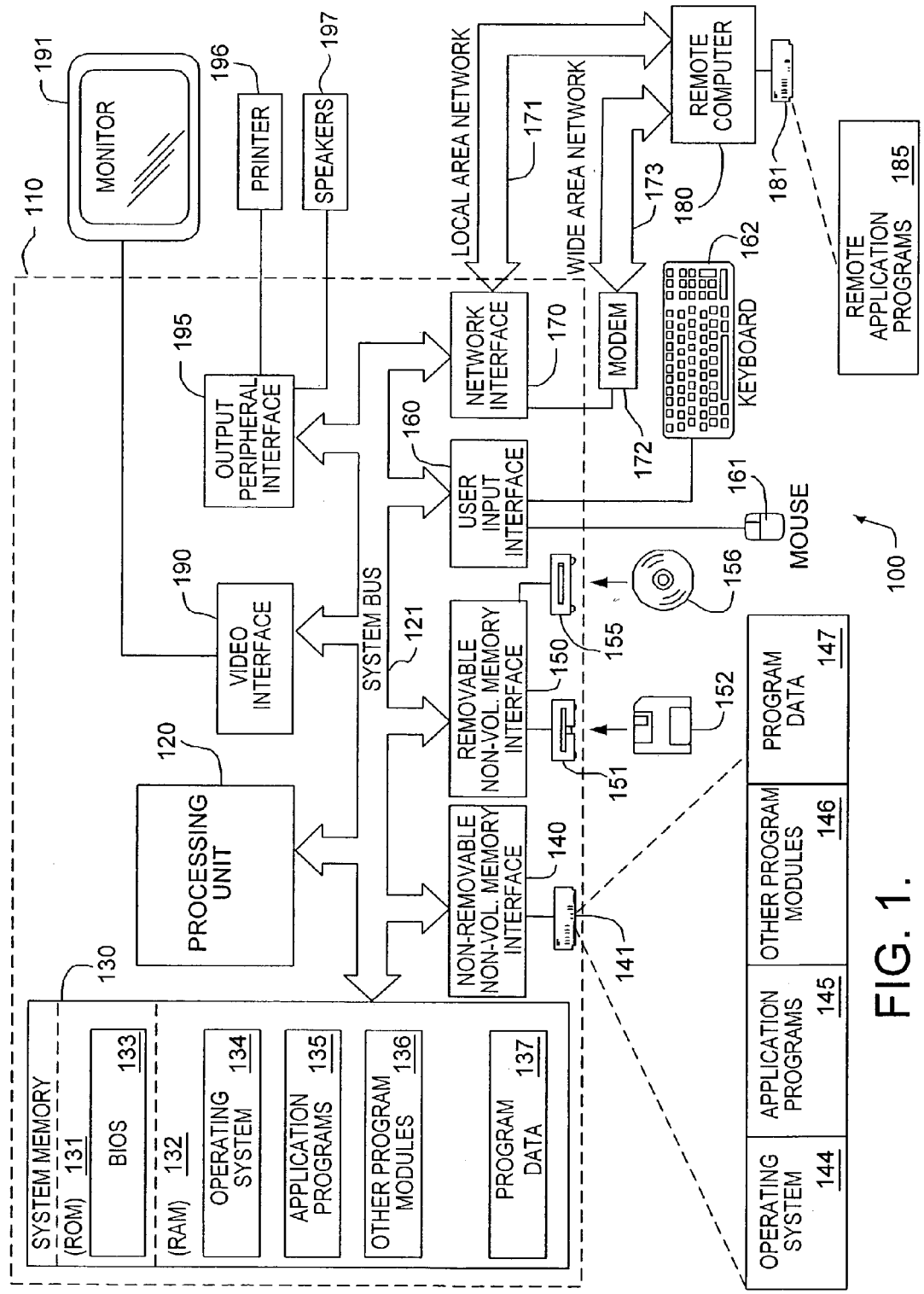
FIG. 1 is a block diagram of a computing system environment suitable for use in implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Accessibility System Structure

Figure 2:
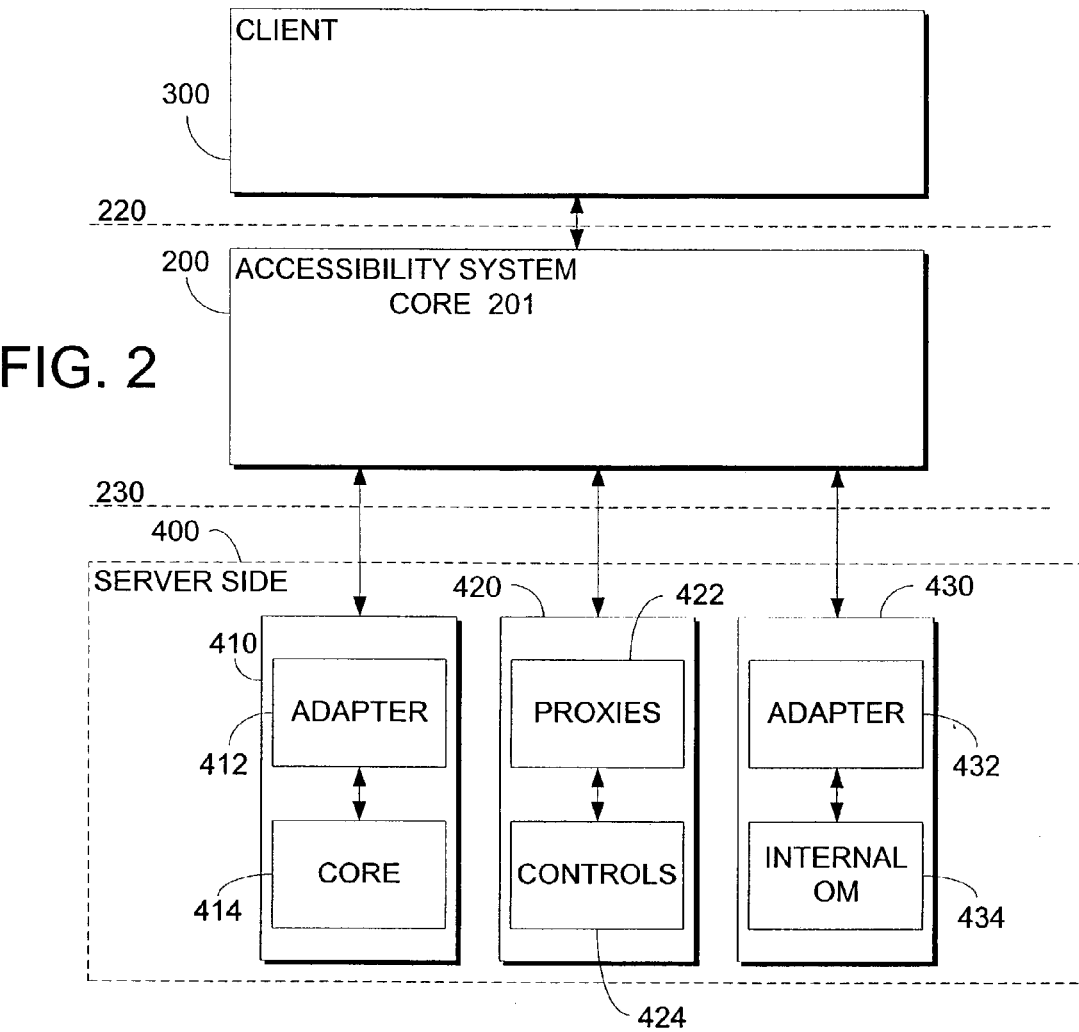
FIG. 2 is a block diagram of interaction between an accessibility system, a client environment, and a server environment.

As shown in FIG. 2, an accessibility system 200 interacts with a client environment 300 and a server environment 400. The accessibility system 200 may be implemented in the computer environment 100 described above with respect to FIG. 1. The accessibility system 200 includes a client side accessibility interface 220 for facilitating interaction with the client 300, a server side accessibility interface 230 for facilitating interaction with the server side 400, and an accessibility system core 201. The accessibility system 200 of the invention provides new application program interfaces (APIs), interfaces, and metaphors for programmatically accessing a user interface (UI). The accessibility system 200 allows applications to make themselves and any components they use accessible.

The client environment 300 preferably includes an assistive technology (AT) product or automated UI testing tool. The server side 400 may implement a variety of different technologies as shown in FIG. 2. A server system 410 includes an adapter 412 and a core 414, which may be found in a first type of UI. A server system 420 includes a proxies component 422 and controls 424 as may be found in a second type of UI, such as a Win32 UI available in Microsoft Operating System products, from the Microsoft Corporation of Redmond, Wash. The server system 430 includes an adapter 432 and internal OM 434, which may be found in an alternative third type of UI.

Figure 3:
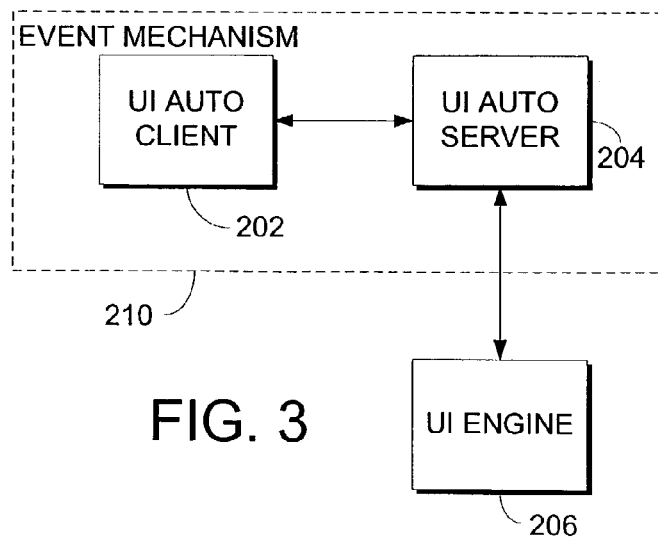
FIG. 3 is a block diagram illustrating components of the accessibility system core.

As shown in FIG. 3, an event mechanism 210, which is included in the accessibility system 200, relies on a UI automation client 202 and a UI automation server 204 for facilitating interaction with the client environment 300 and the server environment 400. The UI automation client 202 and the UI automation server 204 are described in greater detail below with reference to the events mechanism 210 of the invention. The accessibility system 200 of the invention gives the client (AT Product) 300 the capability to: (1) gather information about an application's user interface; (2) programmatically discover and interrogate UI elements regardless of the technology used to build the UI; (3) generate keyboard and pointer input; and (4) understand what type of behavior or functionality is currently available. The accessibility system 200 allows applications to make themselves and their components accessible. The structure shown in FIGS. 2 and 3 enables five major aspects of the accessibility system 200 including: (1) logical UI tree; (2) Control Patterns; (3) Event Mechanism; (4) Input API (not covered in this document); and (5) properties.

UI Access Logical Tree 222

Figure 4A:
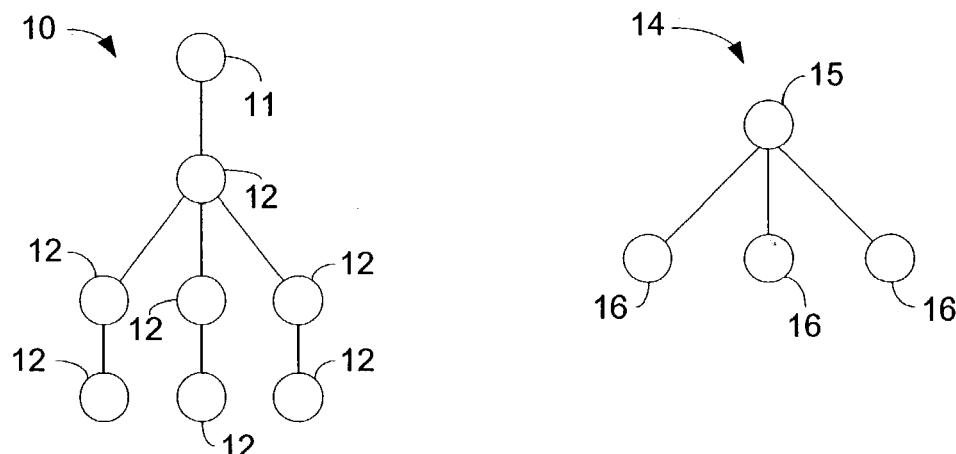
FIGS. 4(A)-4(D) illustrate the creation of a logical tree from native elements.
Figure 4B:
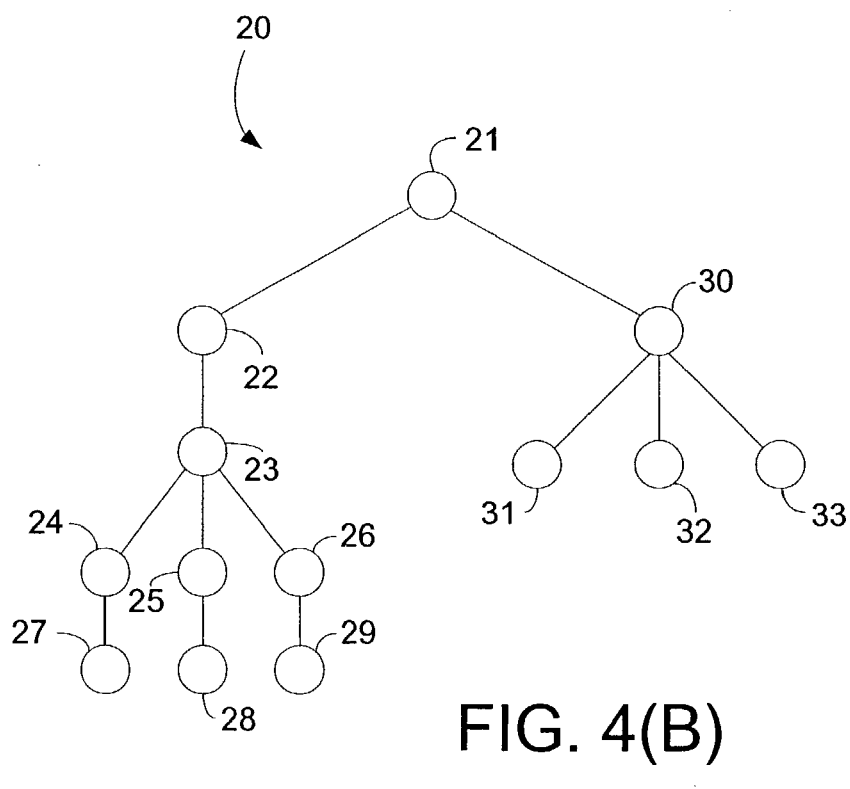
Figure 4C:
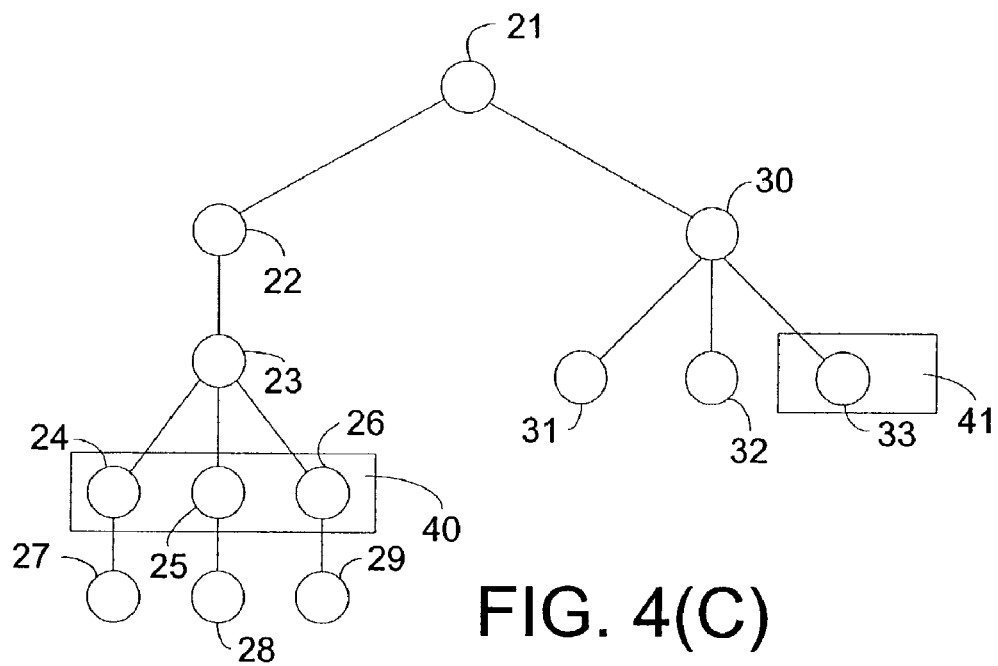
Figure 4D:
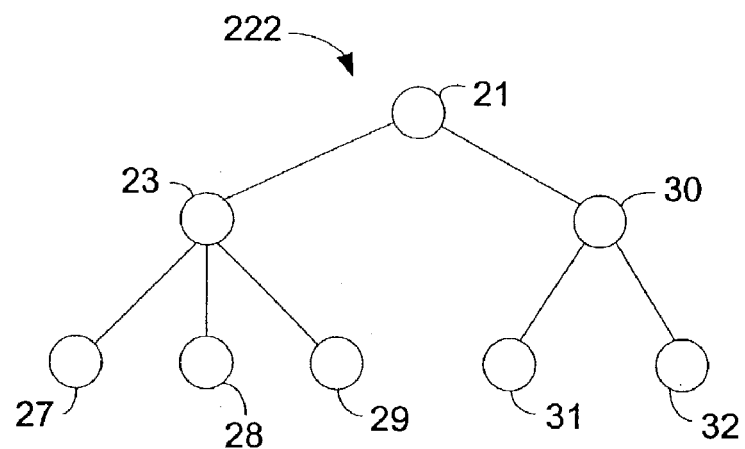

An integral component of the accessibility system 200 is the logical tree 222, an example of which is shown in FIG. 4(D). The tree 222 is included in the client side accessibility interface 220.

The logical tree 222 is a filtered view of the underlying structural hierarchy of UI elements, not a separate tree that must be implemented by the control or application developer. Instead, it keys off a few well-defined properties, interesting and uninteresting, which indicate whether a structural element should be exposed in the logical tree 222. The accessibility system core 201 consumes this information to produce the filtered UI logical tree 222 that is, in turn, presented to the AT products or test script.

The logical tree 222 is a tree of elements, each of which represents a control, an item in a control, or a grouping structure, which may be a dialog, pane, or frame. The structure of the logical tree 222 should represent the UI of the application as perceived by the user (even if the controls are actually implemented using a different underlying structure). The tree should be stable over time. As long as an application looks the same to a user, the logical tree 222 representing that application should remain the same, even if implementation details of the application behind the scenes have changed. Native elements that exist for structural and implementation reasons, such as a shell's "ShDocView" window in the Microsoft OS products should not appear in this tree, since the user does not perceive them.

The logical tree 222 is a single tree built from a plurality of fragments that is capable of unifying a plurality of different processes so that they are the same to the client. The logical tree 222 enables bulk retrieval and is capable of obtaining a value for a list of properties. By the time a user normally would have invoked a cross process call to ask for values, the accessibility system 200 will have fetched them through the use of the logical tree 222.

Figure 5:
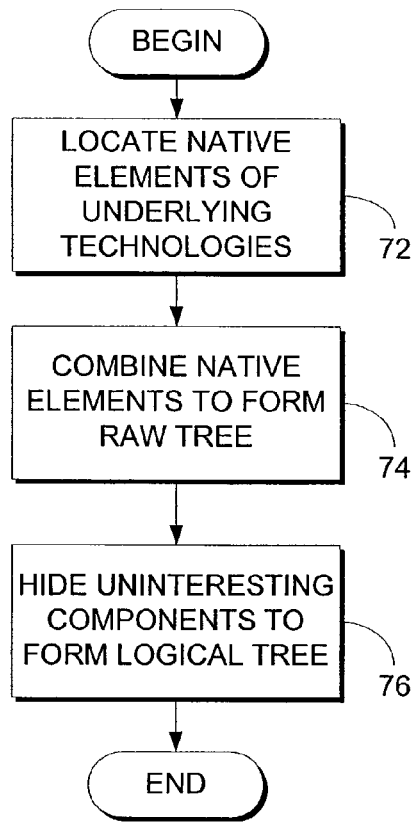
FIG. 5 is a flowchart showing a sequence of procedures for building a logical tree.

Instead of being constructed in one step as in the known systems, the logical tree 222 is constructed from fragments that are used to build a raw tree. As shown in FIG. 5, three main procedures build the logical tree 222. In procedure 72, the accessibility system 200 locates native elements of underlying technologies and arrives at the native trees shown in FIG. 4(A). In procedure 74, the accessibility system 200 combines native elements to form the raw tree 20 as shown in FIG. 4(B). Finally, in procedure 76, the logical tree 222 is obtained by hiding uninteresting components in the raw tree 20 as shown in FIG. 4(D).

FIG. 4(A) illustrates two native trees 10 and 14, which are constructed from native elements of underlying technologies such as the Win32 UI, or any other available UI. The native tree 10 includes a parent node 11 and a plurality of descendants 12 having various relationships with one another. Similarly, the native tree 14 includes a parent node 15 having a plurality of child nodes 16. The child nodes 16 may be described as siblings of one another.

As shown in FIG. 4(B), the native trees 10 and 14 may be combined to form a raw tree 20. The raw tree 20 includes a parent node 21, having two child nodes 22 and 30. The child node 22 has descendants 23-29 and the child node 30 has descendants 31-33. This raw tree 20 is a combination of the native trees 10 and 14, with the nodes of the native tree 10 forming nodes 22-29 and the nodes of the native tree 14 forming nodes 30-33.

Through a method broadly shown in FIGS. 4(C) and 4(D), the raw tree 20 is converted into the logical tree 222. To move from the raw tree 20 to the logical tree 222, a developer can insert hints in the raw tree. The developer can mark nodes within the raw tree 20 as "hide self" or "hide self and children" or as "hide children of node", etc. The developer can also move nodes sideways or place nodes before children. These "hints" and modifications in the raw tree 20 are used to form the logical tree 222. For example, in FIG. 4(C), a developer has marked nodes 24-26 and 33 of the raw tree 20 as uninteresting as indicated by blocks 40 and 41. Typically, nodes that contain elements that will not be visible to the user are marked as uninteresting. Nodes related to the visible UI are typically considered to be interesting and will be included in the logical tree 222 for use by the AT client 300. As shown in FIG. 4(D), the nodes marked as uninteresting are not included in the logical tree 222.

The accessibility system 200 uses the logical tree 222 to find information about events, the state of the system, the location of objects and information about controls. Known systems have not had the capability to scope within their trees. The logical tree 222 can be navigated based on the preferences of the client 300 and is capable of providing information regardless of the server side application in use.

In operation, if a client 300 needs to obtain information for a user about an application, the client 300 looks for a button to press and observes text on the button. The client 300 would call an API "find an element". The API will return a value that is referenced to a position in the logical tree 222 of the client side interface 220. Through the logical tree 222, the accessibility system 200 gives the client 300 an abstract view of the UI regardless of the application in use. The abstract model includes structures, properties, events, and functionality that a list box, button or other UI component can expect to have in common with one another.

The logical tree 222 is a single unifying tree that is a logical representation of the UI and is formed into a shape that includes only elements of interest to clients 300. Accordingly, instead of forcing AT products to filter the structural hierarchy of UI elements and guess at the model being presented to the end user, the logical tree 222 presents a hierarchy that closely maps to the structure being presented to the end user. This greatly simplifies the AT product's task of describing the UI to the user and helps the user interact with the application.

Figure 6:
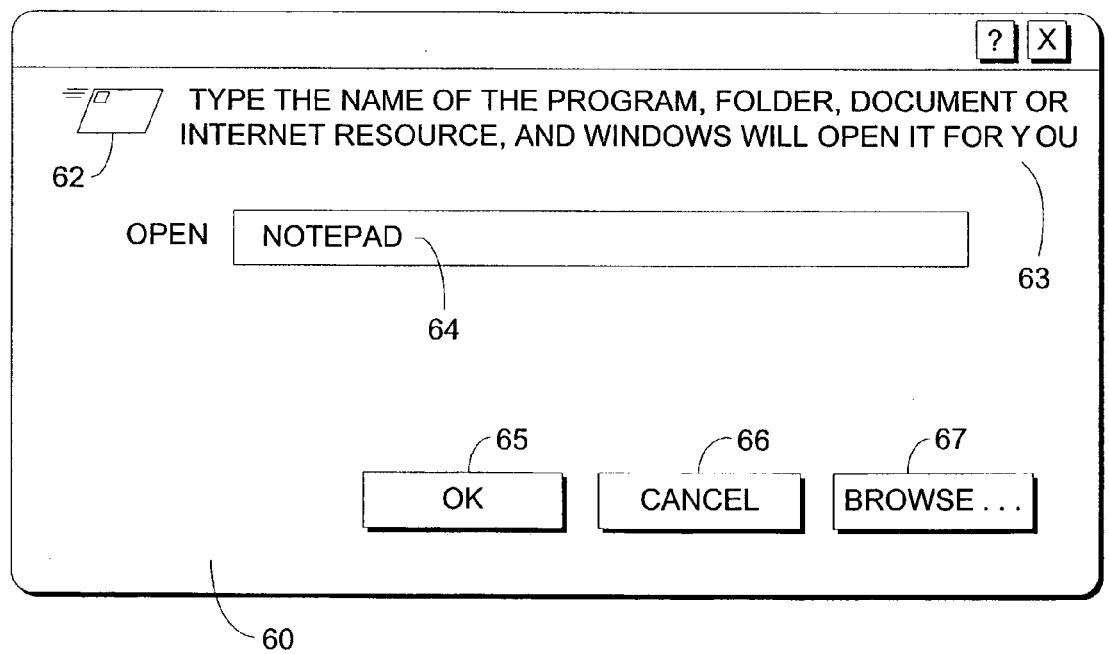
FIG. 6 shows a dialog box and its components forming logical elements.

Because this logical UI tree 222 is a fundamental part of the accessibility system 200, all of the other components of the accessibility system 200 are designed to work from the logical tree 222. For example, FIG. 6 shows a simple dialog box 60 that appears to have a very simple structure. However, when viewed through the currently available accessibility technology, the structure of this dialog box 60 is surprisingly complex. It contains 264 objects that an AT product must filter through to discover those that are meaningful to the end user. With the accessibility system 200 and its support for the logical UI Tree 222, the developer who owns this dialog box 60 can set a few properties to present the following structure shown in FIG. 6 to the AT products 300.

As shown in FIG. 6, for a "Run" dialog, the developer can indicate as interesting, the flying window graphic 62 and "Type the name of program, folder, document, or internet resource and windows will open it for you" at 63. The developer can also indicate as interesting the combo box 64 including notepad, word, calculator, etc., and the OK 65, cancel 66 and browse 67 buttons. This offers developers a low-cost mechanism to tag their element hierarchy and thereby produce a logical representation of their application's UI through the UI accessibility system 200. Each of the features shown may be represented by a node that has a specified relationship to each other node in the logical tree 222. This logical representation offers an immediate benefit to a testing team and to AT products or clients 300.

A set of APIs allows the client 300 to get to the tree. Functionality includes: (1) logical element from point to point; (2) logical element from event; and (3) currently focused logical element. As set forth above, a logical element represents a UI component, possibly a control, a part of a control, or a container or logical grouping (i.e. dialog, pane, or frame). Controls can vary greatly in terms of their functionality. Accordingly, different interfaces are used to represent functionality associated with particular types of controls. These control-specific interfaces derive from a common base interface that represents functionality common to all controls. The common base interface contains: (1) methods for navigating the logical tree 222; (2) a general method for getting property values; and (3) methods for accessing supported control-specific interfaces. In navigating the logical tree 222, each underlying application UI technology will provide its own technique for navigation.

Although the logical tree 222 is of ultimate interest to the user, the raw element tree 20 also serves some important functions. While the logical tree 222 contains only elements that the user can relate to, the raw element tree 20 contains nodes, such as 22, that represent the implementation structure of the underlying framework. For a Win32 UI fragment, for example, this tree would contain nodes that represent HWNDs. In some respects, the raw element tree 20 is a 'half-way house' between the logical element tree 222 and the underlying frameworks' own native element trees. The raw element tree 20 is used as a basis for building the logical element tree 222, and it is where native elements first plug into the system.

The raw element tree 20 can also be used for debugging and testing. It is useful for pinpointing or describing where a particular problematic node is. Functionality on a base raw element node includes: methods for navigating the raw element tree; a method for jumping to a corresponding logical element (if one exists); property containing 'debug string' for this element—e.g. "HWND 0x483FE" for HWND nodes; and other 'behind the scenes infrastructure' methods. These other methods enable hit testing and location; events; and exposing properties that frameworks can easily provide (e.g. focused, enabled).

The raw element tree 20 contains nodes 22-33 that represent elements from various rendering engines. The raw element tree is used as a starting point for rendering engines to plug themselves into the accessibility system 200 and is built from lightweight adapter objects which adapt native elements, such as HWNDs from Win32, into a unified logical tree 222. It is additionally used for handling hosting transitions, where one technology hosts another. Since the raw element tree 20 is the base on which the logical tree 222 is built, it can be used to check that the logical tree 222 is complete and connected and can be used to check for unaccounted-for elements. The raw element tree 20 may further be used for other infrastructure-like tasks: such as providing some basic element ID and providing some basic framework-provided element properties, such as focused, enabled, and location.

The raw element tree 20 is not the primary source of information for AT products or clients 300, is not used for logical navigation and is not exposed to end-users. The raw element tree 20 also cannot be used to capture an element's position in tree so that it can be returned to at some future point in time. The logical element tree 222 performs all these functions.

The raw element tree 20 can typically be built mechanically from the raw elements of the underlying rendering technology (HWNDs, Elements) without knowledge of the logical elements represented. It can therefore be used to look for raw elements, which have not been accounted for in the logical tree 222. The raw element tree 20 is a useful debugging and diagnostic tool, as it allows a 'stack dump'-like description of a node's location to be captured. Furthermore, known systems base their trees on code specific criteria and are difficult to implement with diverse technologies. The present approach uses a general abstract 'raw element' type, which can be implemented by or on behalf of any underlying rendering technology.

In order to obtain the raw element tree, calling a raw element root will get a desktop element, verified by making sure that its parent is NULL and all other nodes have it as their ultimate ancestor. To obtain other elements, calling a method to obtain a raw element from a specified point will return the element using valid screen coordinates. After obtaining the raw element tree, it can be checked and verified by checking the elements (parents, siblings and children).

In operation, the client 300 can navigate the raw element tree 20 using relationships such as: parent; next sibling, previous sibling, first child, last child, etc. The client 300 can then jump from the raw element to the corresponding logical element in the logical tree 222.

Events Mechanism

When a client 300 wants to keep informed of events, the client 300 is able to register through the UI automation client 202 as shown in FIG. 3 to obtain the information. The client 300 specifies object information it wants to receive, where it wants the information to go, and the list of properties it wants to get back. The client request goes to UI automation client 202. UI automation client 202 can monitor any process on the desktop. The UI automation server 204 keeps track of which clients 300 are listening and knows how to get back to UI automation client 202. The UI automation client 202 advises the UI engine 206 of client interest, so the UI engine 206 knows when to tell the UI automation server 204 of the event. The UI engine does not have to utilize the client advice but may choose instead to always notify the UI automation server 204 of events or notify the UI automation server only if a client is listening for any events. The advice is useful if the UI engine wants to turn on UI automation server notification only if there is a client listening for events. The UI engine would do this to avoid possible degradation of speed of the UI and to avoid loading code modules it doesn't otherwise need.

The UI Engine 206 then informs the UI automation server 204 of a UI event. UI automation server 204 returns the requested logical element to the client 300 and sends information to the client 300 including properties of the event that the client 300 requested. The UI automation server 204 decides what information is within the scope of client request and only forms a logical element if the information is of interest. Forming a logical element includes pre-fetching, on the UI automation server side, the set of properties that the client has indicated it will use when handling the event. For example, the UI automation server 204 can discover a logical element for a combo box. The scope would be the combo box or its children. The client 300 can request children/parent/dependents to define scope during the registration phase.

After the UI automation server 204 determines whether information is within the requested scope, it builds a logical element. The UI automation client 202 serves the client 300 by talking to target applications receiving the requested information from the UI automation server 204 and routing objects to a proper space on the client 300.

The UI automation server 204 is created when the client 300 registers to receive event notification. As an example, a UI engine 206 is running the Microsoft Word word processing application. The client 300 has registered for name property change. The client's registration causes the UI automation server 204 to be created. The client's registration also advises the UI engine 206 to start notifying the UI automation server 204 for the name property. The UI engine 206 doesn't get scope information. The UI engine 206 calls one of the APIs for the server side. The UI engine 206 specifies (1) what property changed; (2) the new value of the property; and (3) perhaps the old value. The UI automation server 204 is created based on events of interest to the client 300 and therefore knows events, properties, clients, and scope of interest so it knows if any client 300 is interested in the created logical element. If more than one client 300 has registered for events with a particular UI automation server 204 and the clients 300 have registered for the same event and have asked for properties to be bulk fetched with the returned logical element, when the UI automation server 204 sends an event back to the clients 300, each client 300 will get the union of the requested bulk fetch properties returned with the logical element.

For each client 300 listening, the UI automation server 204 notifies the client 300 passing the client the logical element associated with the event. The UI automation server 204 creates only one logical element. This is an improvement over the current technology in which each client 300 would be required to ask for their own copy of the object that is the source of the event.

If the UI engine 206 does not utilize the UI automation client's advice when clients register for events, the UI engine 206 can ask the UI automation server 204 if there are any accessibility clients 300 listening and if no one is listening, then can avoid the work of creating the information and sending it to the UI automation server 206. For example, a screen reader is the client 300 and specifies where it wants information to go, the focus change object to receive events, and the specific list of properties of interest. The UI engine 206 is advised and knows it should send events to the UI automation server 204. Upon detecting focus changes, the UI engine 206 notifies the UI automation server 204. The UI automation server 204 converts to a well-known interface and sends the event and object to the UI automation client 202. The UI automation client 202 routes the object to an appropriate space on the client 300.

The above-described components improve upon the known systems by eliminating the central repository in the kernel for events. Instead, the UI automation server 204 knows all clients 300 interested in getting information about the context in which it is running. The elimination of the kernel repository also creates a more peer-to-peer interaction, since the UI automation server 204 fulfills the function previously performed in the kernel. The accessibility system 200 of the invention gives client 300 the ability to specify what it wants to see such that filtering is accomplished on the server side using the UI automation server 204.

Figure 7:
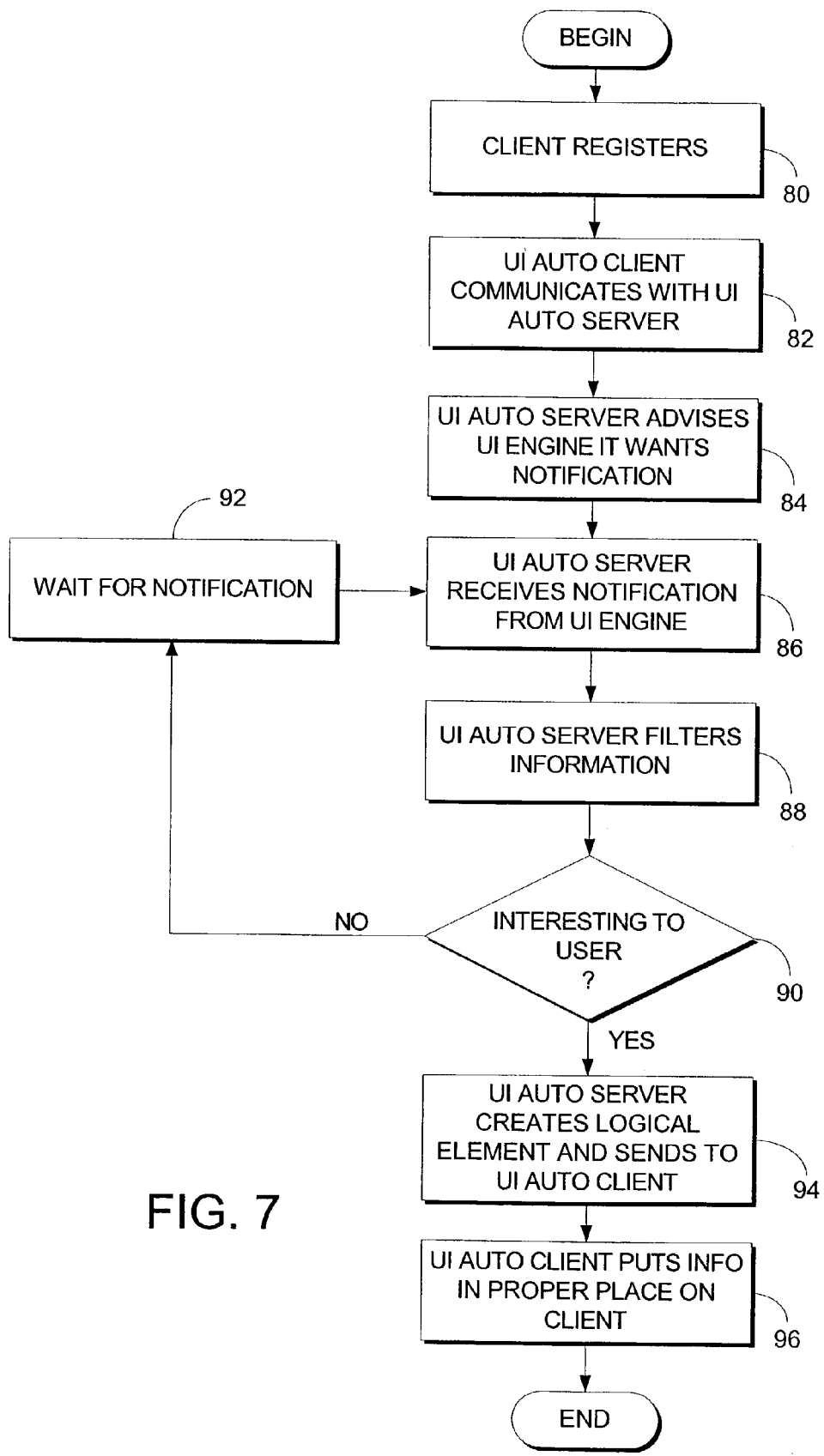
FIG. 7 is a flowchart illustrating procedures involved in activating an event mechanism of the invention.
Figure 8:
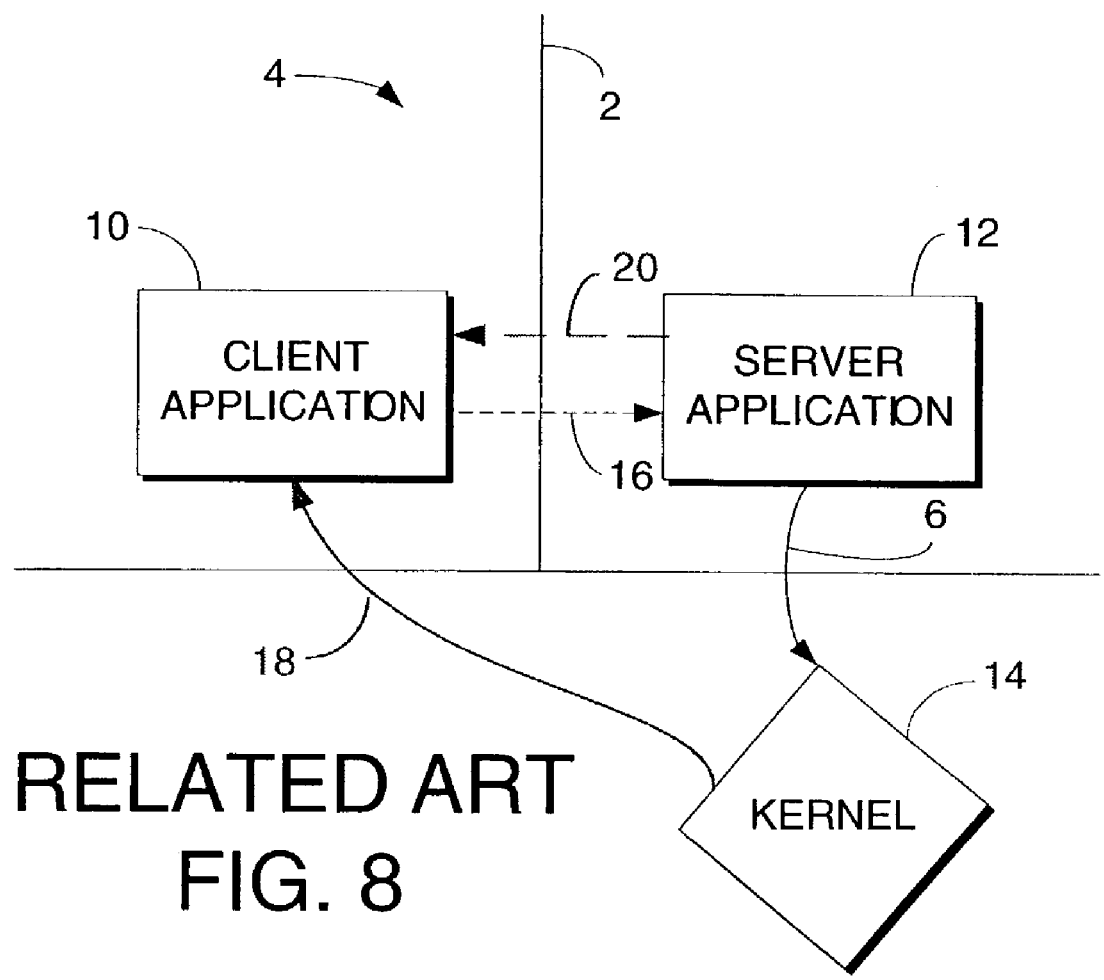
FIG. 8 shows a known system for event notification.

FIG. 7 is a flow chart showing the procedures involved in the event registration and notification method. In step 80, the client 300 requests event notification. In step 82, the UI automation client 202 communicates the request to the UI automation server 204. In step 84, the UI automation client advises the UI engine 206 that it wants notification. In step 86, the UI automation server 204 receives notification from the UI engine 206. In step 88, the UI automation server 204 filters the received information. If the received information is found uninteresting to the user in step 90, the UI automation server 204 discards the information and continues to wait for notification in step 92. Alternatively, if the information is found to be interesting in step 90, the UI automation server 204 creates a logical element and sends it to the UI automation client 202 in step 94. In step 96, the UI automation client 202 puts the received information in its proper place on the client 300.

The event mechanism 210 of the accessibility system 200 allows the client 300 to register to receive event notifications for property changes in the UI, tree changes in a control's structure, multimedia events, and related information. Without these capabilities, clients 300 have to continually poll all the UI elements in the system to see if any information, structure, or state has changed. The accessibility system 200 events mechanism 210 also allows clients 300 to receive events out-of-process, request a collection of properties to be returned with the event notification, and to register for events on multiple elements.

The event mechanism 210 exposes: the interfaces the AT product or test application uses to register for events; interfaces the AT product implements on objects used to receive event notifications; and the interfaces control implementers use to notify the event engine of UI events. The event mechanism 210 is used to allow AT products and test applications to receive events independently of the UI engines used to render UI and allows AT products and test applications to track top-level application windows and focus without regard to the underlying technology.

FIG. 2 shows how clients 300 interact with the accessibility system 200. There is no global management of events across processes. Instead, each accessibility system client 300 or server 400 has its own context. Client applications will only receive events for applications that support the accessibility system 200. To start using accessibility system events in an application, the client 300 can do one of four things: (1) Use the "AddTopLevelWindowListener" API to discover new UI appearing on the desktop and in the handler for that event, register for other events and by this means receive events from any process; (2) Use one of the Find APIs to locate interesting UI and target a specific piece of UI; (3) Use some other means to discover interesting UI such as finding a window handle or a point on the screen and, using that handle or point, acquire a logical element to use as a reference for listening to events; or (4) Use the "AddFocusChangedListener" API to track the input focus and register for events on the UI that currently has focus.

A top-level window is a window whose parent is the desktop. The use of the term "opened" indicates that a new top-level window has appeared to the user. The use of the term "closed" indicates that a top-level window has been destroyed.

The accessibility system server side interface 230 includes two APIs for notifying the accessibility system 200 of events being added and removed. The UI automation client calls these APIs when clients register and unregister for events. This allows the UI engine 206 to get information about what accessibility events are being requested in its context.

Where applicable, events are associated with logical elements from the application's logical element tree 222. Where logical elements are not applicable, events are associated with a human readable string or other well-known object that represents the source of an event. The event mechanism 210 provides filtering based on user supplied preferences during event registration. By using the client's filtering preferences at the server, before creating the event-related data and sending it cross process to the client, the event mechanism 210 inherently improves out-of-process performance by reducing the number of cross process calls. The event mechanism 210 provides a way to specify the properties of a logical element that are interesting for the event during event registration. This further reduces the number of cross-process calls. The event mechanism 210 is extensible without requiring major operating system (OS) changes. Although the event mechanism 210 may be implemented using managed code, unmanaged applications can access it through COM interoperability.

There are two tasks the AT client 300 performs to handle events: (1) event registration; and (2) handling the event in a callback. An important requirement for either task is to be usable in both managed and unmanaged code. In one embodiment of the invention, the client 300 may pass interfaces when registering for events. The client 300 passes objects that implement well-known interfaces when registering and the UI engine 206 calls back on those interfaces to notify the listener. In the cases where there is a source object in the logical element tree 222, each of the callbacks receives the source element and an additional parameter.

Well-known interfaces implemented by the AT product are used as the way to return events. The following sections show some types of events, what registration looks like and how the event is received.

1. Top-Level Window Events

Top level window events include events related to menus and combo box dropdowns or any feature having the desktop as a parent. In an embodiment of the invention, an AddTopLevelWindowListener method is used to receive notification of top level windows being opened and closed. Calling AddTopLevelWindowListener will get notifications for new top-level windows opening or top-level windows being closed on the current desktop. A RemoveTopLevelWindowListener method provides a mechanism to stop receiving notifications for top-level windows being opened, or closed, on the desktop. This method uses a callback object to identify this listener. Therefore, the object passed in to the RemoveTopLevelWindowListener method is the same as that passed to AddTopLevelWindowListener. An OnTopLevelWindowOpened method is called by the accessibility system 200 once for each new, top-level window that is opened. Similarly, an OnTopLevelWindowClosed method may be called by the accessibility system 200 once when a top-level window has closed. To receive these notifications, the client 300 calls the AddTopLevelWindowListener method.

2. Focus Events

Clients 300 often require a method for tracking focus. Doing this in the Microsoft Windows OS is difficult. For instance, when a menu is dropped down (e.g. the File menu in Microsoft Word) the items in the menu get focus as the user moves the cursor down each one. When the menu closes (e.g. the user presses the ESC key) today there is no focus event sent. Instead the client interested in focus changes must listen to a number of events and figure out which of those logically represents a focus change. In an embodiment of the invention, an AddFocusChangedListener method may be used to notify the listener of focus change events. The client 300 may specify a set of properties to be returned. This feature of specifying properties to return with the logical element is part of all event registration APIs. The client 300 may call a RemoveFocusChangedListener method to stop receiving notifications for focus changes. This method may use the callback object to identify this listener and in this case the objects passed in to the RemoveFocusChangedListener method will be the same as that passed to the AddFocusChangedListener procedure. The accessibility system 200 calls an OnFocusChanged method when focus has changed. A FocusEventArgs parameter used in the OnFocusChanged method exposes information related to the focus change. If the information about the last focused logical element is available, then that element will be available in the event args parameter used in the OnFocusChanged element. There are cases when no UI element has focus until something explicitly puts focus on an element.

3. Property Change Events

Property change events are fired when properties of logical elements change. In an embodiment of the invention, a client 300 calls an AddPropertyChangedListener method to receive notifications for property changes. An OnPropertyChanged method is called by the accessibility system 200 when the value of a property has changed on a logical element within the logical element tree specified in AddPropertyChangedListener. A scope parameter indicates for what elements an event should be fired. For instance, passing the root logical element of a window and a request for descendants limits property change callbacks to that window. If the scope parameter is set to all elements in the tree, then the scope is ignored and any changes to the specified properties that occur on the desktop are sent. A client 300 may call AddPropertyChangedListener multiple times with different sets of properties and/or a different callback object. The notification provided by the accessibility system 200 indicates: the property that changed; the new property value; and the old property value if available.

A client 300 may call a RemovePropertyChangedListener method to stop receiving notifications for property changes. This method may use the scope element and callback object to identify this listener and in this case the objects passed in must be the same as that passed to AddPropertyChangedListener.

4. Events from Controls Patterns

The events fired from controls patterns need to be extensible and therefore these events are identified by a GUID. Any GUID value is accepted when registering. For any new control pattern, the events it documents need to be unique GUIDs. AT products may need to be modified to listen for new control pattern events. The listener also needs to be able to scope these events. For instance, directed testing may want to limit these events to a particular application or control within an application. The controls patterns define what the source is and event consumers will need to refer to that part of the documentation in order to know how to use a source element and event argument object.

An AddEventListener method will enable the client 300 to receive events for controls. The scope parameter can be used to indicate for what elements to fire events. For instance, passing the root logical element of a window and requesting descendants will limit events to that window. If all elements in the tree are desired, then all events on the desktop will be sent. A RemoveEventListener method may be used to stop receiving an event for controls. This method may use the scope element, callback object and an event identifier to identify the listener. In this case, the objects passed in must be the same as that passed to AddEventListener.

When an application has invoked the AddEventListener method, an OnEvent method is called by the accessibility system 200 when a control-specific event is fired and the source of the event is a logical element within the logical element tree specified in AddEventListener. When events for controls are fired there is often event-specific information available.

A RemoveAllListeners method may be called to stop receiving any events. This is a quick way to clean up before a client application shuts down. The removal method may optimally be used when terminating an application.

5. Logical Structure Change Events

Logical structure change events are fired when the logical element tree structure changes. An AddLogicalStructureChangedListener method may be implemented to receive notifications for structural changes in the logical element tree. When logical elements are added, removed or invalidated, methods on the specified callback object are called. The scope parameter can limit the elements as set forth above. A RemoveLogicalStructureChangedListener method may be called to stop receiving events for logical element tree changes. This method may use a callback object and a scope element to identify this listener and in this case the objects passed in must be the same as those passed to AddEventListener.

An OnChildAdded method may be called by the accessibility system 200 when a child element is added and the parent is a logical element within the logical element tree 222 specified in AddLogicalStructureChangedListener. An OnChildRemoved method is called by the accessibility system 200 when a child element is removed and the old parent is a logical element within the logical element tree specified in AddLogicalStructureChangedListener.

An OnChildrenBulkAdded method is called by the accessibility system when a large number of children are added (e.g. greater than 20 children) within a short period of time. An OnChildrenBulkRemoved method is called by the accessibility system when a large number of children are removed within a short period of time. An OnChildrenInvalidated method is called by the accessibility system 200 when a large number of children (e.g. greater than 20 children) are both added and removed within a short period of time.

6. Multimedia Events

Another type of event is the multimedia event. Multimedia may include sound, video, and animation. The methods will support multimedia events and notify a client of actions including "stopped", "paused", "fastforwarded", "rewound", and "muted". Methods similar to those described above may be implemented for adding and removing multimedia listeners.

7. Simple Sound Events

Simple sound events may be handled separately from multimedia events. Simple sound events represent simple, short-duration, sounds that exist to convey to the user some event other than the sound itself. Simple sound events may include: the sound played when new mail has arrived; the sound generated when the battery on a laptop is low; or the sound played when a message box is displayed with the IconExclamation type. An AddSoundListener method can be called to receive notification of simple sounds being played and a RemoveSoundListener method may be implemented to stop receiving notifications for simple sound events.

An OnSound method is called by the accessibility system 200 when a simple sound has played. To receive this notification, the listening application calls AddSoundListener. The OnSound method retrieves the following information: the name of the sound; the source of the sound; and an alert level value indicating the importance of the sound to the user. Possible alert levels include: 'unknown', indicating that the importance is unknown; 'informational', indicating that information has been presented; 'warning', indicating a warning condition; 'question', indicating that a user response is required; 'exclamation', indicating that the event is non-critical but may be important; and 'critical', indicating the occurrence of a critical event.

8. Soft Focus Events

Soft focus events appear on the desktop but stay in the background. Some examples of soft focus events are: a balloon help window indicating "New updates are available" in the notification area; a flashing icon in the task bar for a background application that wants to gain focus; and a printer icon appearing and disappearing from the notification tray when printing starts and ends. These events may seem to overlap somewhat with other event categories (multimedia may involve animation events as does soft focus) However, the event will be categorized based on what it conveys to the user rather than how it is conveyed.

An AddSoftFocusListener method may be implemented to receive notification of events that try to get the user's attention without taking the input focus. A RemoveSoftFocusListener method stops the notification. This method may use the callback object to identify this listener and therefore the object passed in should be the same as that passed to AddSoftFocusListener.

An OnSoftFocus method may be called by the accessibility system 200 when a soft focus event has occurred. To receive this notification, the listening application or client 300 calls AddSoftFocusListener. A source element, if available, can be used to get more information about the event. An example source element would be the logical root element of a balloon help window used by one of the notification applications in the system tray. The OnSoftFocus method returns: name of the event; source of the event; and the alert level indicating importance to the user.

The following chart illustrates the actions of the client 300 and the accessibility system 200 when the client 300 uses an AddTopLevelWindowListener API to listen to events from a specific process.

| Client | Accessibility system and the target UI window |
| --- | --- |
| Calls AddTopLevelWindowListener | Accessibility system client starts a thread to watch for top-level application windows being created and destroyed. New UI appears and the Accessibility system client calls the client's OnTopLevelWindowOpened method. |
| From the OnTopLevelWindowOpened method calls other APIs to register for additional events happening in the target UI window. | Accessibility system client communicates the event Id's to the target UI window so it can be selective in notifying of events. Accessibility system client communicates the event Id's and filtering information to the Accessibility system server so it can further filter events. Target UI window uses the accessibility system server API to notify the accessibility system server side of the events of interest. |
| Handles events in the callback objects | Accessibility system server communicates events back to the accessibility system client. Accessibility system client calls back on the objects the client application supplied |

| Client | Accessibility system and the target UI window |
| --- | --- |
| | with registration. |
| Calls RemoveListener APIs to stop receiving events | Accessibility system client communicates to the accessibility system server and to the target UI window the events that are no longer of interest. The target app stops notifying the accessibility system server of events. |

Event Notification

Corresponding event notification methods are used by the server 400 or underlying UI engine to support the accessibility system events enumerated above. The UI automation server APIs include methods that the server or underlying UI engine may call to accomplish this. For instance, there is a NotifyPropertyChanged method for the server to call to notify when a particular property changes on a logical element. It is up to the server 400 or underlying UI engine to generate the appropriate parameters and call these notification methods when the UI changes.

Server Methods

An AdviseEventAdded method and an AdviseEventRemoved method are called by the UI automation client to notify the server 400 when clients 300 are requesting events. This allows the server 400 to not propagate events to the accessibility system 200 when there is no one interested. Servers can use these notifications to make performance dependent on whether there are clients using the events.

Control Patterns

The accessibility model offers a unique approach to categorizing and exposing the functionality supported by a particular UI element or control. Instead of associating functionality with a specific control type, (for example, a button, an edit box, or a list box) as in the prior art, the accessibility model defines a set of common control patterns that each define one aspect of UI behavior. Because these patterns are independent of each other, they can be combined to describe the full set of functionality supported by a particular UI element.

For example, instead of describing an element in terms of its class name, such as Button, the accessibility system 200 describes it as supporting the invokable control pattern. A control pattern defines the structure, properties, events, and methods supported by an element. Therefore, these patterns not only allow the client to query a control's behavior, they also allow it to programmatically manipulate the control by using interfaces designed for a particular pattern. For example, a SelectionContainer pattern provides methods to query for the selected items, to select or deselect a specific item, or to determine if the control supports single or multiple selection modes.

The control patterns currently defined for the accessibility system 300 include: (1) Selection Container; (2) Hierarchy; (3) Invokable; (4) Simple Grid; (5) Text; (6) Value; (7) Represents Object; (8) Scrollable; (9) Sortable; (10) Drawing; and (11) Other Container.

This technique enables control developers to implement a new type of control while still having a well-defined approach for exposing its behavior to AT products and test scripts. If a new type of behavior is introduced, a new control pattern can be defined to express the required functionality.

Assistive technology products and test scripts can now be written to understand how to work with each pattern, instead of each UI control. Because there are far fewer control patterns than control classes, this techniques minimizes necessary code. This approach also encourages a more flexible architecture that can effectively interrogate and manipulate new controls (as long as they support known control patterns).

The following table provides some examples of common controls and the patterns they will support.

| Control | Relevant Control Patterns |
| --- | --- |
| Button | Invokable |
| Checkbox, Radiobutton | Value |
| Listbox | SelectionContainer, Scrollable |
| Combobox | SelectionContainer, Scrollable, Value |
| Treeview | SelectionContainer, Scrollable, Hierarchy |
| Listview | SelectionContainer, Scrollable, Sortable |
| Textbox, Edit | Value, Text, Scrollable |

More specific interfaces will be used to expose functionality associated with common control patterns. Examples of these patterns include: (1) selection managing containers; (2) grid layout containers; (3) UI elements that contain values; (4) Icons that represent objects (files, emails, etc); and (5) UI elements that may be invoked. In general, these patterns are not tightly bound to specific controls and different controls may implement the same patterns. For example, listboxes, combo boxes, and treeviews all implement the 'selection managing container' pattern. Some controls may implement multiple patterns if appropriate: a selection grid would implement both the 'Grid layout container' pattern and the 'Selection managing container' pattern.

There is no single 'role' property as in previous applications. Instead, two separate mechanisms are used. Control patterns determine the available functionality of a control and a human-readable localizable property provides a control-type name that the user can understand, such as 'button', 'list box', etc.

Properties

The accessibility system 200 will feature a general GetProperty method. Properties are preferably represented by GUIDs, with utility methods used to translate to and from a non-localizable mnemonic form (useful for scripting and config files) and also to obtain localized descriptions. The two key advantages of a general GetProperty method instead of individual methods are that (a) it allows for new properties to be added over time without changing the interface, and (b) it allows for implementation techniques-such as array-driven bulk property fetching-that are not possible when using separate methods. Each property must have a clearly defined intent. Whether the property is intended for human or machine consumption, whether the property is to be localized, etc., must be clearly defined.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated and with the scope of the claims.

What is claimed is:

1. An accessibility system having a processor and memory providing user interface information to a client configured for users having disabilities, the accessibility system comprising:
   an accessibility system core including user interface automation services registering the client configured for users having disabilities and filtering information based on whether the user interface information matches an event registration request, which specifies an object, a scope for the object, a storage location, and a list of properties of the object, said user interface information being provided to the client configured for users having disabilities;
   a client side interface including a logical tree revealing user interface information that matches said event registration request provided to the client configured for users having disabilities and hiding user interface information that does not match said event registration request provided to the client configured for users having disabilities; and
   a server side interface enabling information transfer from a server side application to the accessibility system core regardless of user interface engine used to build the server side application, wherein the user interface automation services of the accessibility system core comprise:
   an event mechanism including a user interface automation client communicatively connected to a user interface automation server, wherein the user interface automation client operates across the client side interface to receive said event registration request from the client configured for users having disabilities and to communicate with the user interface automation server to inform the user interface automation server of the event registration request, wherein the user interface automation server is created when the client configured for users having disabilities initiates the event registration request and operates across the server side interface to seek event information from a user interface engine connected to the server side interface to monitor a user interface of said user interface engine for events that match said event registration request, to filter event information in correspondence with the event registration request, to create said logical element tree based on the filtered event information, and to transmit the logical element tree to the user interface automation client to place the logical element tree with the client configured for users have disabilities.

2. The accessibility system of claim 1, wherein the logical tree includes a plurality of elements, wherein each of the elements represent one of a control, an item in a control, or a grouping structure.

3. The accessibility system of claim 1, wherein an underlying application technology determines an appropriate technique for navigating the logical tree.

4. The accessibility system of claim 1, wherein the logical tree unifies user interfaces from different applications and different user interface frameworks.

5. The accessibility system of claim 1, further comprising interfaces for exposing functionality associated with control patterns.

6. The accessibility system of claim 5, wherein an accessibility system application programming interface (API)

returns a logical tree position to provide the client configured for users having disabilities with information pertaining to an application.

7. A computer-implemented method for providing user interface information to a client configured for users having disabilities, the method comprising the steps of:

registering, through an accessibility system core including user interface automation services, the client configured for users having disabilities and filtering a first user interface information based on whether the user interface information matches an event registration request, which specifies an object, a scope for the object, a storage location, and a list of properties of the object, said first user interface information being provided to the client configured for users having disabilities:

revealing, through a client side interface including a logical tree, the user interface information that matches said event registration request and hiding, through said client side interface including said logical tree, user interface information that does not match said event registration request; and enabling, through a server side interface, information transfer from a server side application to the accessibility system core regardless of user interface engine used to build the server side application, wherein the user interface automation services of the accessibility system core comprise:

an event mechanism including a user interface automation client communicatively connected to a user interface automation server, wherein the user interface automation client operates across the client side interface to receive said event registration request from the client configured for users having disabilities and to communicate with the user interface automation server to inform the user interface automation server of the event registration request, wherein the user interface automation server is created when the client configured for users having disabilities initiates the event registration request and operates across the server side interface to seek event information from a user interface engine connected to the server side interface to monitor a user interface of said user interface engine for events that match said event registration request, to filter event information in correspondence with the event registration request, to create said logical element tree based on the filtered event information, and to transmit the logical element tree to the user interface automation client to place the logical element tree with the client configured for users have disabilities.

8. The method of claim 7, further comprising representing one of: a control, an item in a control, or a grouping structure with each element in the logical tree.

9. The method of claim 7, further comprising determining an appropriate technique for navigating the logical tree using an underlying application technology.

10. The method of claim 7, further comprising unifying user interfaces from different applications in the logical tree.

11. The method of claim 7, further comprising providing interfaces for exposing functionality associated with control patterns.

12. The method of claim 7, further comprising using an accessibility system to return a logical tree position to provide the client configured for users having disabilities with information pertaining to an application.

13. The accessibility system of claim 1, wherein the client configured for users having disabilities is an assistive technology application.

14. The accessibility system of claim 1, wherein the client configured for users having disabilities is at least one of a screen reader application or screen magnifier application.

15. One or more computer-storage media storing instructions for a method to provide user interface information to a client configured for users having disabilities, the method comprising the steps of:

registering, through an accessibility system core including user interface automation services, the client configured for users having disabilities and filtering a first user interface information based on whether the user interface information matches an event registration request, which specifies an object, a scope for the object, a storage location, and a list of properties of the object, said first user interface information being provided to the client configured for users having disabilities;

revealing, through a client side interface including a logical tree, the user interface information that matches said event registration request and hiding, through said client side interface including said logical tree, user interface information that does not match said event registration request; and enabling, through a server side interface, information transfer from a server side application to the accessibility system core regardless of user interface engine used to build the server side application, wherein the user interface automation services of the accessibility system core comprise:

an event mechanism including a user interface automation client communicatively connected to a user interface automation server, wherein the user interface automation client operates across the client side interface to receive said event registration request from the client configured for users having disabilities and to communicate with the user interface automation server to inform the user interface automation server of the event registration request, wherein the user interface automation server is created when the client configured for users having disabilities initiates the event registration request and operates across the server side interface to seek event information from a user interface engine connected to the server side interface to monitor a user interface of said user interface engine for events that match said event registration request, to filter event information in correspondence with the event registration request, to create said logical element tree based on the filtered event information, and to transmit the logical element tree to the user interface automation client to place the logical element tree with the client configured for users have disabilities.

* * * * *